United States Patent
Moses et al.

(10) Patent No.: US 6,499,110 B1
(45) Date of Patent: Dec. 24, 2002

(54) METHOD AND APPARATUS FOR FACILITATING INFORMATION SECURITY POLICY CONTROL ON A PER SECURITY ENGINE USER BASIS

(75) Inventors: Timothy E. Moses, Kanata (CA); Glenn C. Langford, Kanata (CA)

(73) Assignee: Entrust Technologies Limited, Ottawa (CA)

( * ) Notice: Subject to any disclaimer, the term of this patent is extended or adjusted under 35 U.S.C. 154(b) by 0 days.

(21) Appl. No.: 09/343,904

(22) Filed: Jun. 30, 1999

Related U.S. Application Data (63) Continuation-in-part of application No. 09/220,247, filed on Dec. 23, 1998.

(51) Int. Cl.[7] .................................................. H04L 9/00
(52) U.S. Cl. ..................... 713/201; 713/151; 713/152
(58) Field of Search ................................. 713/201, 200, 713/155, 156, 164, 166, 151, 152, 182

(56) References Cited

U.S. PATENT DOCUMENTS 6,202,157 B1 * 3/2001 Brownlie et al. ............ 709/229

* cited by examiner

Primary Examiner—Matthew B. Smithers
(74) Attorney, Agent, or Firm—Vedder, Price, Kaufman & Kammholz (57) ABSTRACT

An apparatus and method facilitates information security policy control for an information security engine by utilizing security policy association data on a per security engine user basis. Security policy association data may include, for example, data representing identification information of the user of the security engine along with corresponding policy identification data. Policy user identification data may be a hash value of the disk image of an executable software application which uses the security engine, along with policy object identification data which indicates which policy (or policies) that particular application is required to use. A security engine obtains access to this information and also obtains comparison information such as generating a realtime hash value of a calling application that is requesting use of the security engine and compares the newly generated hash value to a stored hash value included as the policy association data. If the hash values match, indicating that the calling application has been previously approved by the trusted policy authority, the policy rules referenced by the policy association data are then employed by the security engine.

39 Claims, 6 Drawing Sheets

METHOD AND APPARATUS FOR FACILITATING INFORMATION SECURITY POLICY CONTROL ON A PER SECURITY ENGINE USER BASIS

CROSS REFERENCE TO RELATED CO-PENDING APPLICATIONS

This application is a continuation in part of co-pending patent application entitled "Method and Apparatus for Controlling Application Access to Limited Access Based Data", filed on Dec. 23, 1998, having Ser. No. 09/220247, inventors Langford et al., assigned to instant assignee, and hereby incorporated by reference.

This application is also related to a co-pending patent application entitled "A Computer network Security System and Method Having Unilateral Enforceable Security Policy Provision" having Ser. No. 08/986457, filed on Dec. 08, 1997, having inventors Van Oorschot et al., and owned by instant assignee.

FIELD OF THE INVENTION

The invention relates generally to information security systems and methods and more particularly to information security systems and methods having enforceable security policy provisions.

BACKGROUND OF THE INVENTION

Information security systems such as those employing public key cryptography techniques to encrypt and decrypt data, typically use a certification authority, such as a trusted network server, to generate certificates that are used by network nodes to verify, among other things, that other communications sent by users are valid. Information security systems are known which allow network nodes to have several software applications that use the same security enforcement rules by having a cryptographic engine which is accessible by each of the applications. For example, an E-mail application may access the cryptographic engine to encrypt E-mail messages. Likewise a financial document generation application may also allow access to the cryptographic engine to encrypt financial documents that may be transferred over communication links.

Conventional systems typically hard code security policy rules in the subscribers, such as network nodes so that a node requires upgraded software each time a security officer changes a policy rule. Some global policies include for example a lifetime of a password, whether or not passwords can be reused, password length, the type of cryptographic keys allowable for a particular node and other policies. Hard-coded policy rules become cumbersome and can be costly to change in large systems. Moreover, such systems do not typically allow differing policies to be set for differing nodes or for differing environments or for differing applications or for differing users, such as corporate email systems run on several servers and nodes in various organizations.

Some systems allow non-hard coded policy provisions to be used, but such systems do not typically allow the policy provisions to be definable through a centralized authority. It is desirable to have central control to institute policies to facilitate a more controlled environment particularly where a compromised communication can cause great damage to members of the network.

It is also desirable to provide policy flexibility in instances where policy rules need to be changed on a per application and/or per node basis. For example, where a node is used by a temporary employee or where the node is used by a user requiring a very high level security or high-security application, differing lengths of passwords or password life times may be necessary for each of the independent network nodes or applications.

Some systems employ attribute certificates to allow specification of information (attributes) other than public keys (but related to a certificate issuing authority, entity or public key), so that it is conveyed in a trusted manner to a relying party. Attribute certificates are conventionally associated with a specific signature public key by binding the attribute information to the key by the method by which the key is identified. For example the binding may be by using the serial number of a corresponding public key certificate, or to a hash-value of the public key or certificate.

Typically, attributes may be signed by an attributed certificate authority, created in conjunction with an attribute registration authority, and distributed in conjunction with an attribute directory service. More generally, any party with a signature key and appropriate recognizable authority may create an attribute certificate. Typically, such attribute certificates are associated with a signature public key and forwarded by a party with a signed message to a relying party that verifies the signature on the received message and uses the attribute certificate to verify proper authority associated with the signature key. One known application is to certify authorization or privilege information related to a public key. More specifically, this may be used, for example, to limit liability resulting from a digital signature, or to constrain the use of a public key (e.g., to transactions of limited values, certain types, or during certain hours). However, such methods can unnecessarily increase system overhead and complexity since the attribute certificates are generally associated with a public key and must be verified by a relying party before a privilege is honored.

Also, conventionally, where a user of a cryptographic engine is a software application, each application typically defines and controls its own security policy. For example, a certificate policy object identifier (OID) may be included as a static component of executable code of each application. Since typically different corporations or environments want different policies, this creates the problem that application software must be modified for each corporation and application developers need to be security policy experts.

Alternatively, conventional systems may have the same application software used by each corporation but the underlying security engine or cryptographic engine provides security services that are configured to a fixed security policy. Thus the application runs under a security policy set by the security engine. A problem arises since policy specific alterations of the underlying security engines are made and two different applications running in the same environment cannot operate on different policies. But no single security policy fits all software applications or users of the security engine, different applications or users typically require different policies. For example, an e-mail application may require a less stringent information encryption key length or algorithm than a banking application used for electronic commerce. A problem arises in determining how to associate and enforce different policies for different applications.

Consequently there exists a need for a computer network security system and method having enforceable security policy provisions that allows flexibility from a centralized authority to ensure more consistent control and implementation of the policies while offering flexibility to change policies when needed on a per application basis. Such a system should also allow enforcement of the policies to occur at the network nodes to help reduce overhead requirements of a central authority.

DETAILED DESCRIPTION OF THE PREFERRED EMBODIMENT

Briefly, an apparatus and method facilitates information security policy control for an information security engine by utilizing security policy association data on a per security engine user basis. Security policy association data may include, for example, data representing identification information of the user of the security engine along with corresponding policy identification data. In one example, policy user identification data may be a hash value of an executable software application which uses the security engine, along with policy object identification data which indicates which policy (or policies) that particular application is required to use. In one embodiment, the policy association data is digitally signed by a trusted policy authority and used by applications, subscribers or other entities as the centrally generated policy control information. A security engine obtains access to this information and also obtains comparison information such as generating a realtime hash value of a calling application that is requesting use of the security engine and compares the newly generated hash value to a stored hash value included as the policy association data. If the hash values match, indicating that the calling application has been previously approved by the trusted policy authority, the policy rules referenced by the policy association data are then employed by the security engine.

In an alternate embodiment, a subscriber unit generates its own security policy association data associated with, for example, each application that it runs, and stores it locally. As part of the policy association data, the subscriber generates the policy user identification data and corresponding policy identification data through, for example, a graphic user interface. Where the policy user identification data is a hash value of an application, the subscriber subsequently generates a hash value of the calling application when the calling application wishes to use the security engine. The stored hash value and the newly generated hash value of the application are compared. If they match, the security engine is authorized to use the policy identification data from the stored policy association data to carry out the requisite policy requirements.

Figure 1:
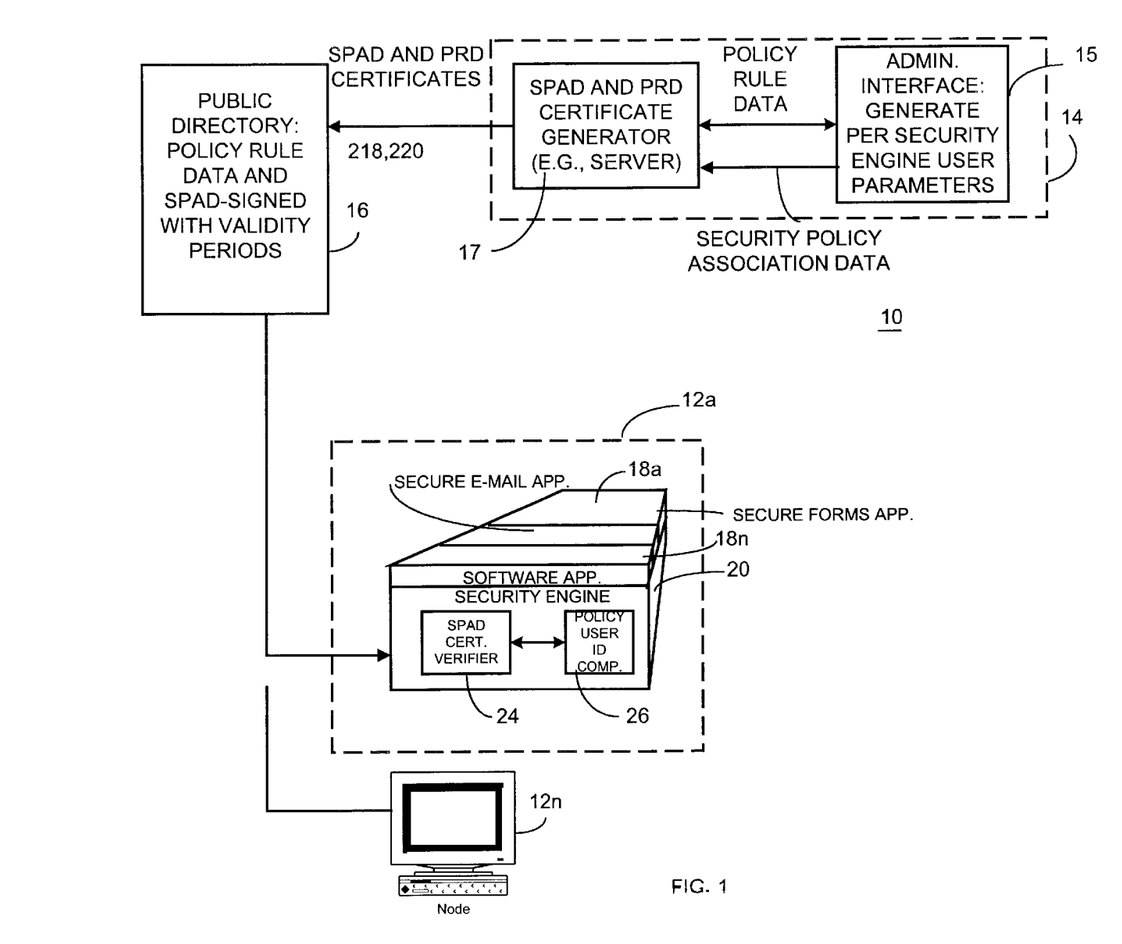
FIG. 1 is a block diagram illustrating one embodiment of a system for facilitating information security policy control in accordance with one embodiment of the invention.

FIG. 1 shows an information system 10 which may be, for example, a public key based security infrastructure having, for example, a plurality of subscribers 12a–12n operatively coupled through any suitable communication link to a policy authority 14. The subscribers have access to, for example, a public directory 16 containing security policy association data in the form of a signed certificate signed by the policy authority 14, along with policy rule data in the form of a signed certificate also generated by the policy authority 14. The policy authority 14 may be incorporated as part of a conventional certification authority, as known in the art, which generates, for example, X.509 type certificates.

The public directory 16 may be, for example, an X.500 repository or any other suitable storage medium for storing security association data whether it is in a signed certificate format or other suitable format.

A subscriber 12a may include, for example, a network node, portable communication device, software application or any other suitable entity. As shown in this example, the subscriber 12a is a computer node having a plurality of software applications 18a–18n which share a common security engine 20. Each subscriber obtains the security policy association data certificate and a policy rule data certificate from the public directory 16 and analyzes these certificates to facilitate security policy control on a per security engine user basis. Alternatively, data could be transferred to the subscriber by store and forward or other method periodically, including for example, by offline methods such as by decoupled storage devices like CD ROMs, diskettes or other devices. The security engine may be, for example, an RSA based public key security engine to, inter alia, decode encrypted data and send encrypted data to other subscribers in the system as known in the art.

The security engine facilitates cryptographic processing of data that is accessible by the plurality of software applications. For example, one application may be a software program for controlling subscribers to perform operations such as retrieving certificates, encrypting messages to be sent and decrypting messages that are received, digitally signing messages to establish data origin authenticity, and verifying received digital signatures. Other applications may include, by way of example, secure e-mail applications which encrypt e-mails that are sent and decrypt e-mails that are received. In addition, another software application may include a secure document application such as a financial document generation program that uses the security engine to digitally sign financial documents and to verify a digital signature on received financial documents. Each application may have different policy rule data that allows different policy requirements to be enforced on a per application or per security engine user basis.

The subscriber 12a also includes a security policy association data verifier 24 and a policy user identification data comparator 26 as further described below.

The policy authority utilizes an administrator interface 15, such as a GUI interface with graphic buttons for selecting or inputting various policy rule settings and policy identification data associated with specific policy rule settings. This information is referred to as policy rule definition data so that the policy rules are defined, for example, by an administrator on a per security engine user basis. Policy rule definition data may refer, for example, to password policies relating to password aging, password reuse, length of a password, allowed cryptographic algorithms, allowed cryptographic key lengths, expiry time rules related to certificates and certificate renewals, rules regarding importing public keys and public key certificates into trusted storage locations, whether certification revocation list storing is allowed or not, how long certificate revocation lists may be locally stored and other desired security policy related parameters. It will be recognized that any suitable policy may be defined as desired. Security policy association data (SPAD) and policy rule data (PRD) are digitally signed by a certificate generator 17 and stored for access by a plurality of subscribers.

Figure 2:
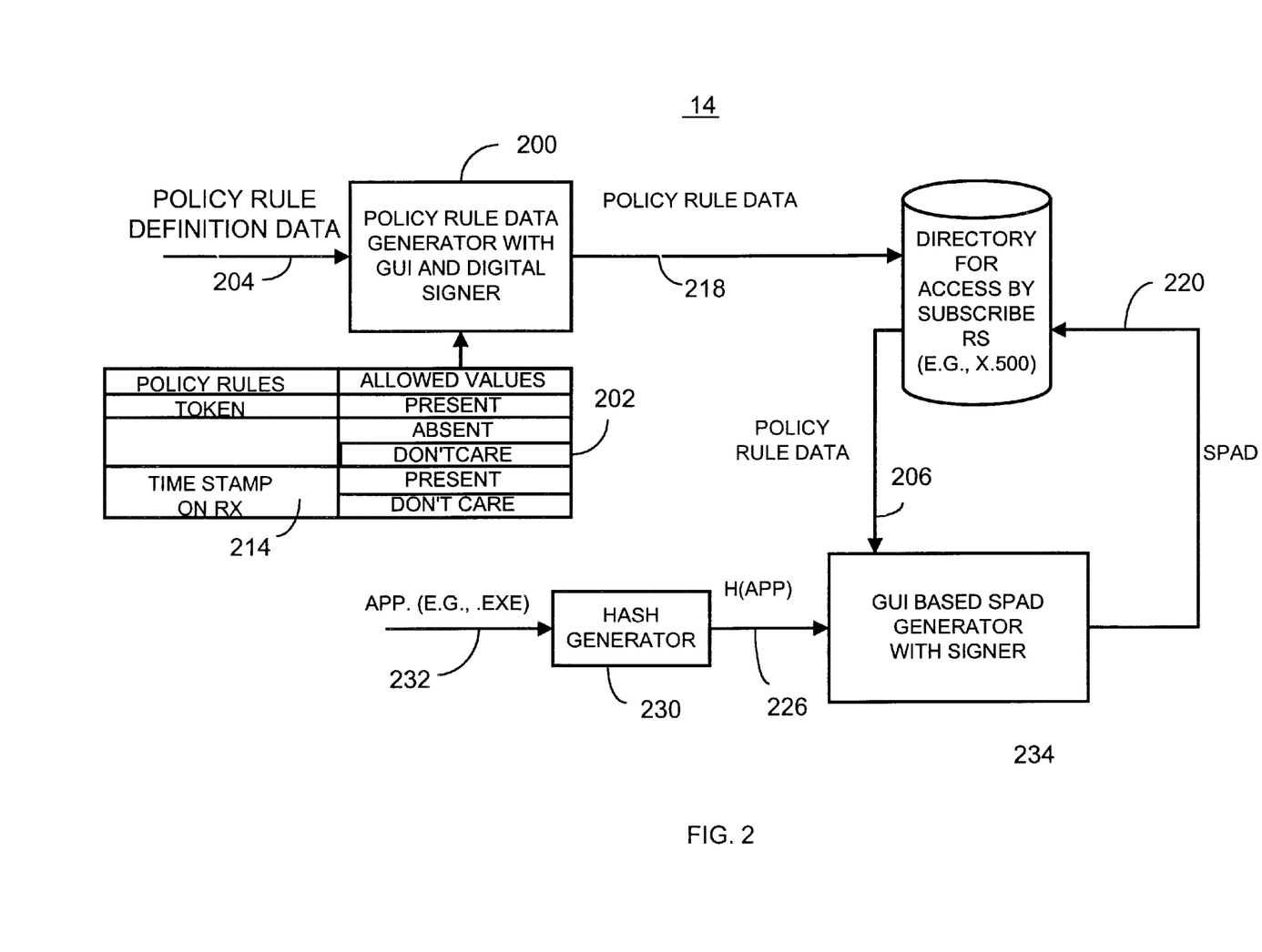
FIG. 2 is a block diagram illustrating one embodiment of a central policy authority that generates security policy association data in accordance with one embodiment of the invention.
Figure 3:
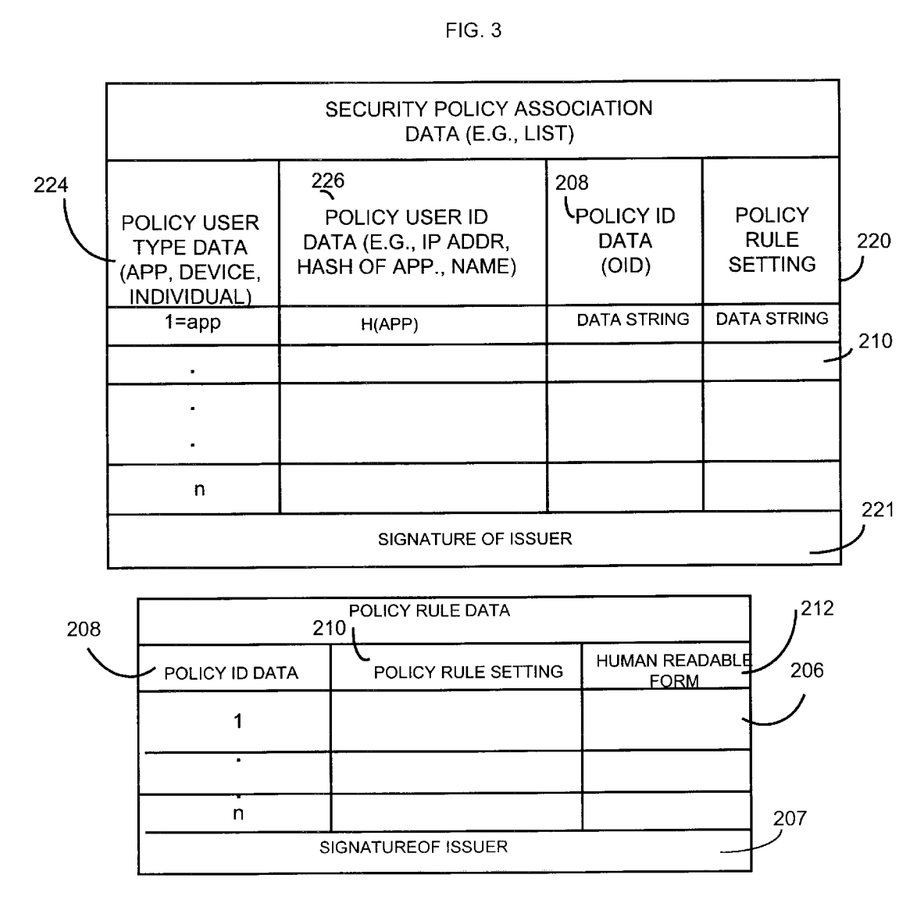
FIG. 3 is a diagram illustrating one example of security policy association data and policy rule data in accordance with one embodiment of the invention.

Referring to FIGS. 2 and 3, one example of the policy authority 14 is shown having a policy rule data generator 200 which may be, for example, a software module which provides a graphic user interface for an administrator and also provides a predefined list of possible policy rules and allowed values 202 in the form of a table stored in memory. An administrator, for example, may select graphic buttons, for example, to provide the policy rule definition data 204 to generate the policy rule data 206 (see FIG. 3). Policy rule data 206 may include, for example, a table or other data structure that includes security policy identification data 208, policy rule settings 210 and human readable form of the policy rules 212 that may be displayed on a display device through a graphic user interface. The policy identification data 208 may be, for example, an object identifier such as a number identifying a policy. Policy rule setting data 210 may be, for example, the settings prescribed by the administrator for the allowed values for a given policy rule 202. For example, if the policy rule relates to whether a time stamp should be applied when information is received, such as policy rule 214, an administrator may indicate that the time stamp operation should be present inasmuch as the policy rule setting would indicate that the time stamp operation should be present for a particular policy. The human readable form 212 is the corresponding text that may be displayed on a screen indicating that the time stamp policy is being selected. The policy rule data generator 200 also includes a public key based digital signer, as known in the art, which applies a digital signature 207 to the password rule data to generate a policy rule data certificate 206. The policy rule data 206 is then stored in the public directory. It will be recognized that any suitable digital signature algorithm may be employed, including public key based, password based or any other suitable technique.

In addition to the policy rule data certificate 218, the central policy authority 14 also generates the security policy association data 220. The central policy authority 14 also uses a graphic user interface along with a software control module suitably programmed to generate security policy association data on a per security engine basis. The security policy association data includes data representing policy user identification data 224 and corresponding policy identification data 226 that corresponds to the policy user type data. In addition, an administrator through a graphic user interface, selects whether a given application, for example, is to have certain policies indicated by the policy identification data 208. When the policy identification data 208 is selected, the corresponding policy rule settings are automatically populated as indexed by the policy rule data 206.

Central policy authority 14 may also include, for example, a hash value generator 230 operative to generate a hash value of data, such as executable file data of a software program 232 which is a user of the security engine. The hash value generator 230 may be any suitable algorithm that generates a hash value or other deterministic value as known in the art. The hash value of an application which is a user of the security engine serves as the policy user identification data 226. The graphic user interface based security policy association data generator 234 allows an administrator, to identify whether the security engine user type is an application, a device, or an individual, for example. The administrator is then requested to indicate the suitable policy identifiers for that given user type. Policy user identification data is automatically generated when the policy user type information indicates the application being defined. Where the policy user type data 224 is a device, the user type data may be an internet protocol address or other suitable data. As such, this information need not be hashed and the policy user identification data may be the same internet protocol address. Hence the policy user type data represents whether a security engine user is a software application or other security engine user type. As shown, the security policy association data may be a list containing objects or any other suitable data structure. The security policy association data contains the policy rule data as shown, excluding the rule data in human readable form. The security policy association data generator 234 obtains the policy rule data certificate 206 from the directory to populate the policy rule settings once the policy identification data is generated through the graphic user interface. The security policy association data generator 24 then digitally signs the policy user type data, the policy user identification data, the policy identification data and the policy rule data by generating a digital signature 221 to form a security policy association certificate 220. The certificate 220 is then stored in the directory for access by any of the subscribers. The security policy association data 24 may use any suitable digital signature process such as RSA, password based or any suitable process.

Figure 4:
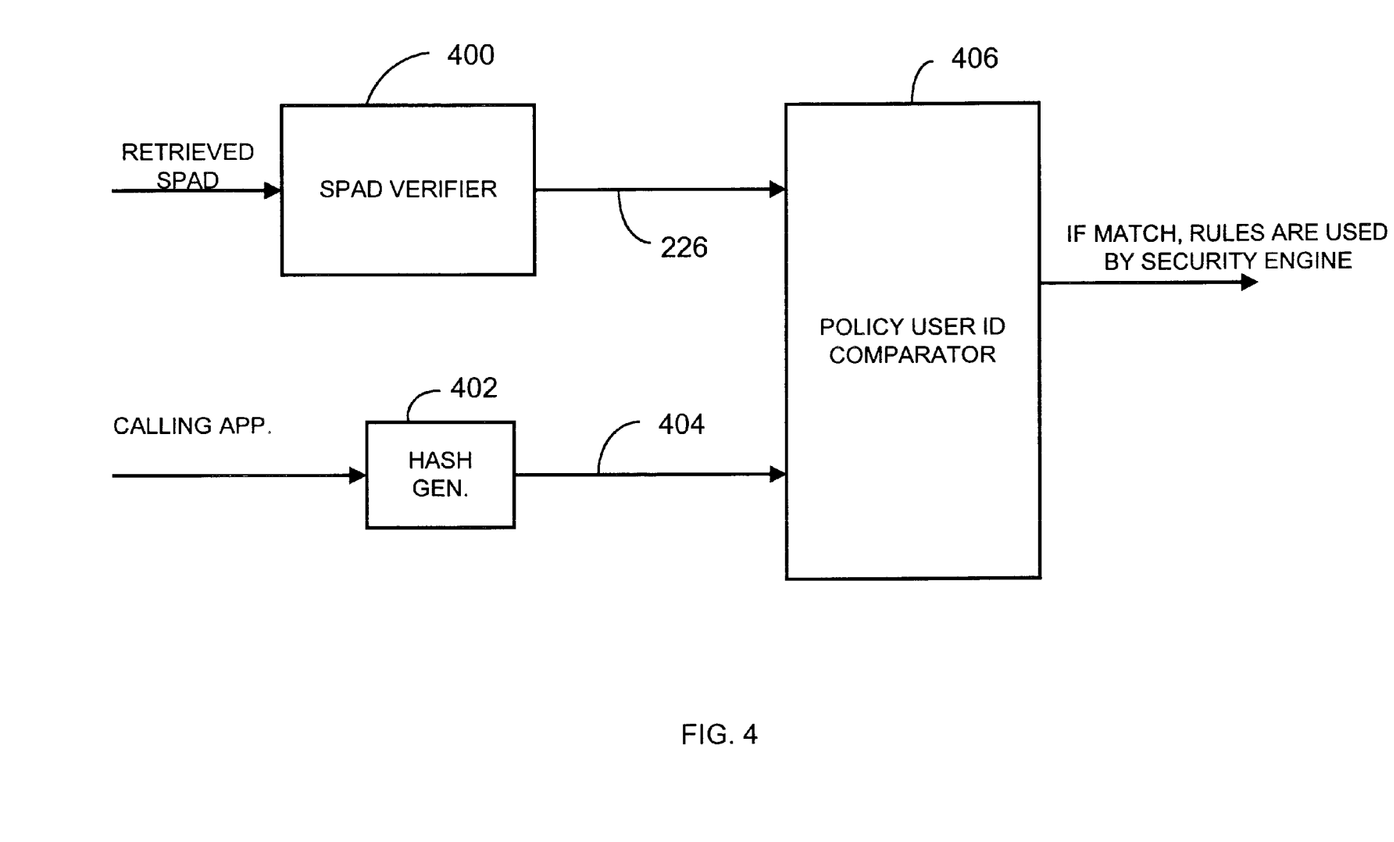
FIG. 4 is a block diagram illustrating one example of a subscriber unit for facilitating information security policy control in accordance with one embodiment of the invention.

FIG. 4 shows one example of a subscriber which in this example includes a plurality of applications that use the security engine. The subscriber retrieves the security policy association data certificate 220 from the repository or locally from cache memory if desired. The subscriber knows which certificate to obtain based upon policy user identification placed in the certificate by the policy authority 14. The retrieved security policy association data certificate has its signature verified by the signature verifier 400 of the subscriber according to conventional signature verification techniques. With the signature properly verified, the security policy association data is then available for use by the subscriber. When a calling application indicates that it wants to call the security engine, the executable file of the calling application is passed through to a hash algorithm 402 to produce policy user ID data 404 each time, preferably, that the calling application wishes to call the security engine. As used herein, executable data may be any data that is understood by a data processing unit. A policy user identification comparator 406 obtains the stored policy user identification data 226 and compares the stored hash value generated by the policy authority to the newly generated hash value generated by the subscriber. The policy user ID comparator 406 compares stored policy user identification data from the security policy association list with the newly generated policy user identification data on a per security engine user basis. In addition, the stored policy identification data 208 is used to control security policy requirements when the policy user identification data matches. As such, the policy rule settings are used by the security engine to carry out the requisite policy requirements such as changing an encryption algorithm, changing the encryption key length for a given application, etc. Accordingly, when a new application is used by a subscriber, for example, the hash value generated by the subscriber may be different from the stored hash value from the policy authority since the policy authority may have generated its hash value based on a previous version of the calling application. The policy user ID comparator may then generate an update request for the user to notify the security policy authority to update the security policy association data stored in the repository. The disclosed system also protects against rogue applications by detecting rogue applications since the hash value of the rogue application will not match a stored hash value generated by the policy authority. This detection preferably occurs prior to the application gaining access to run in the event that the rogue application is a virus or other detrimental application.

If desired, the security policy association data 220 may also include location data such as the directory in which an application is stored, allowing determination of where the executable file data is located in memory of the subscriber. The security engine enforces all security policy rules indicated in the security policy association data for a calling application identified by a policy user identification data. Similarly, if the security engine user is not a software application but instead is a hardware unit identifiable by an IP address for example, the security engine enforces all security policy rules indicated in the security policy association data for that particular policy user as identified by the policy user type data.

As such, the apparatus associates a policy identifier with each application requiring security services, such that when the application executes, the policy is enforced. Security decisions in the underlying security engine are effectively soft coded by the associated policy identification data causing the security engine to behave differently based on the particular application calling the security engine. The policy identification data is physically separated from the application. This allows use of a common security infrastructure or security engine across multiple applications, each application potentially running with a different policy. Consequently, the application software itself need not be aware of the security policy. Hence, security policy in this example, through a certificate, is enforced by the underlying security engine associating a particular application with a particular policy through the use of the policy association data (policy association list). The policy identification data for a particular application or security engine user is stored in that user's entry in a specified location, such as a particular file, particular directory entry or other suitable form. The policy association data entry includes the identifying information for the application or other security engine user. Where the user is a software application, the hash of application's executable disk image is preferably used along with corresponding policy identification data. A per security engine user policy is updated by updating appropriate policy Ids in the policy association data list for corresponding applications in the list. To prevent malicious modification, the policy association data for individual entries therein may be protected by a suitable integrity mechanism such as the digital signature of the issuing unit or other trusted authority as noted.

When an application interacts with a security engine, the engine learns of the application identity through any suitable operating system hook as known in the art. This allows the security engine to look up the application in the stored policy association data list and enforce the appropriate policy identification data for security operations associated with the application. Any suitable application identity information may be used instead of a hash function, for example, the location of the application may also be used if desired.

In the embodiment shown in FIGS. 2–6, the policy information is centrally set and registered through the policy authority. A policy association data set (or list) entry belongs to a particular user. Policies identified by corresponding policy identification data may include whether criteria related to a transaction must be time stamped or archived.

Figure 5:
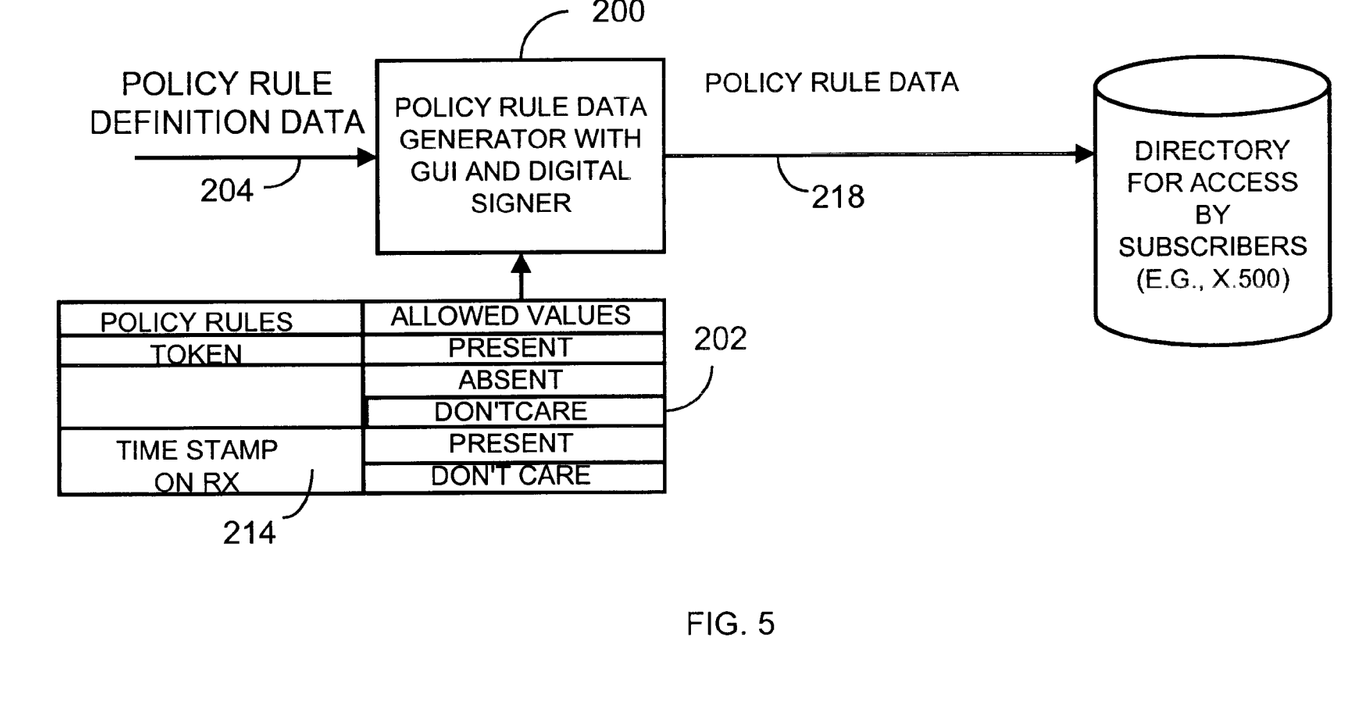
FIG. 5 is an alternate embodiment showing one example of a central policy authority in accordance with one embodiment of the invention.
Figure 6:
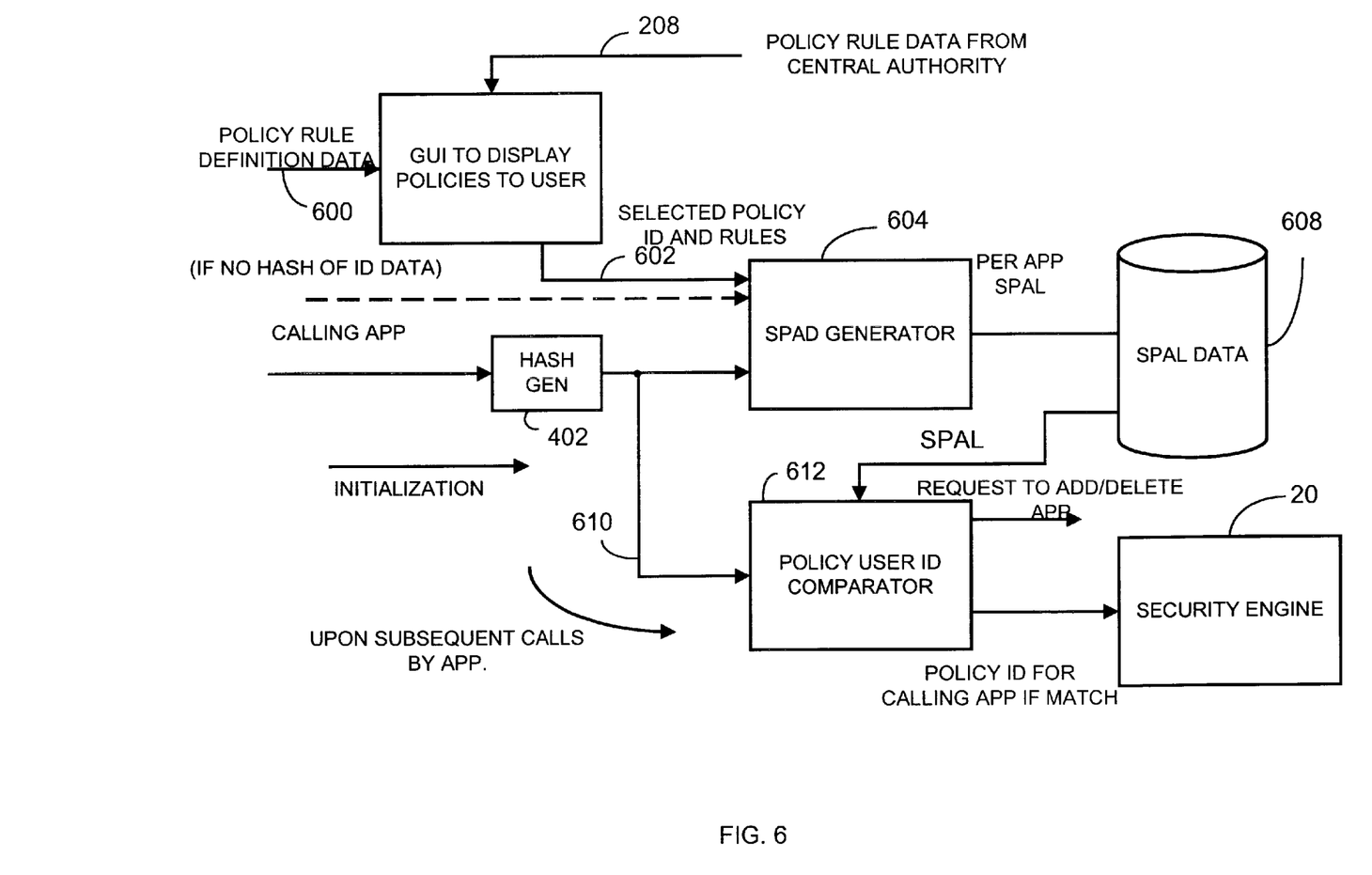
FIG. 6 is a block diagram illustrating an alternative embodiment of a subscriber for facilitating information security policy control in accordance with one embodiment of the invention.

FIGS. 5 and 6 illustrate an alternative embodiment wherein the subscriber unit generates the security policy association data as opposed to a central policy authority. In this embodiment, the central policy authority also includes the policy rule data generator 200 as previously described. As shown in FIG. 6, the subscriber retrieves the policy rule data certificate 208 from the directory and also receives policy selection data 600 that may be entered, for example, through a graphic user interface. The policy selection data includes, for example, those policies selected for a given application or policy user type. As such, the policy selection data may be the same information as the policy rule definition data 204. The selected policy identification data along with corresponding rules data 602 is sent to the security policy association data generator 604. The operation of the SPAD generator 604 would be the same as the generator 234. As such, the subscriber upon initialization generates a hash value of all acceptable applications and stores them as the policy user identification data. As previously described, the security policy association data generator may generate the information 220 without the signature since the subscriber need not send the information to an outside source. The per application-based security policy association data is then stored in local memory 608. During normal operation, when an application is to run, the calling application is then passed through the hash generator 402 to generate a second hash value 610. A policy user ID comparator 612 retrieves the policy user ID data from the security policy association data from memory and compares the stored hash value with the newly generated hash value to determine whether a match exists. If the policy user ID data matches, the security engine is then programmed to provide the security requirements for the calling application.

The above operations may be performed by suitable applications, and processing units as desired. Therefore, the policy rule generators, the security policy association data generator and other operations may be implemented by executable program instructions stored on any suitable storage medium containing memory. For example, the storage medium may include one or more CD ROMS, hard drives, RAMS or any other suitable storage mediums. As such, the storage medium may include memory containing executable program data that when read by one or more processing units, causes the one or more processing units to (among other things): generate security policy association data on a per security engine user basis wherein the security policy association data includes data representing at least first policy user identification data and corresponding policy identification data; store the security policy association data; obtain second policy user identification data after the security policy association data has been generated; and compare at least the first stored policy user identification data with the second policy user identification data on a per security engine use basis and using the stored policy identification to control security policy requirements when the first and second policy user identification data matches.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for facilitating information security policy control for at least one information security engine comprising the steps of:

generating security policy association data on a per security engine user basis wherein the security policy association data includes data representing at least first policy user identification data and corresponding policy identification data wherein the first policy user identification data is based on executable file data of a software program, and wherein the first policy user identification data is derived at least in part by applying a hash function to at least a portion of the executable file data;

storing the security policy association data;

obtaining second policy user identification data after the security policy association data has been generated; and comparing at least the first stored policy user identification data with the second policy user identification data on a per security engine user basis and using the stored policy identification to control security policy requirements when the first and second policy user identification data matches.

2. The method of claim 1 wherein the security policy association data includes policy user type data that includes data representing whether a user is a software application or other security engine user type.

3. The method of claim 1 wherein the security policy association data includes policy rule data.

4. The method of claim 1 wherein the security policy association data further includes location data allowing determination of where the executable file data is located in memory.

5. The method of claim 1 including the step of applying digital signature data of a trusted authority to the policy association data.

6. The method of claim 5 wherein the step of generating the security policy association data is performed by a policy authority unit operatively coupled to a plurality of subscriber units and wherein the digital signature is that of the policy authority unit.

7. The method of claim 5 including the step of using a digital signature verification algorithm to determine whether the digital signature originated from a trusted source.

8. The method of claim 1 wherein the step of comparing includes: computing a hash value of executable file data associated with a calling application as the second policy user identification data; and comparing the computed hash value with the first policy user identification data in the policy association data.

9. The method of claim 1 wherein the security policy association data is a list containing object identifier data as the policy identification data.

10. The method of claim 1 wherein the step of generating the security policy association data is performed by a subscriber unit in a public key infrastructure system.

11. The method of claim 1 including generating selected policy rule data through an interface that receives selectable policy rules and associated allowable values for the policy rules.

12. The method of claim 1 wherein the security engine provides information security operations for a plurality of software applications and wherein the security engine enforces all security policy rules indicated in the security policy association data for a calling application identified by the policy user identification data.

13. An apparatus for facilitating information security policy control for at least one information security engine comprising:

means for generating security policy association data on a per security engine user basis wherein the security policy association data includes data representing at least first policy user identification data and corresponding policy identification data wherein the first policy user identification data is based on executable file data of a software program; and wherein the first policy user identification data is derived at least in part by applying a hash function to at least a portion of the executable file data;

means for storing the security policy association data;

means for obtaining second policy user identification data after the security policy association data has been generated; and means, operatively coupled to the means for storing and the means for obtaining, for comparing at least the first stored policy user identification data with the second policy user identification data on a per security engine use user basis and using the stored policy identification to control security policy requirements when the first and second policy user identification data matches.

14. The apparatus of claim 13 wherein the first policy user identification data is an internet protocol address.

15. The apparatus of claim 13 wherein the security policy association data includes policy user type data that includes data representing whether a user is a software application or other security engine user type.

16. The apparatus of claim 13 wherein the security policy association data includes policy rule data.

17. The apparatus of claim 13 wherein the security policy association data further includes location data allowing determination of where the executable file data is located in memory.

18. The apparatus of claim 13 wherein the means for generating applies digital signature data of a trusted authority to the policy association data.

19. The apparatus of claim 18 wherein the means for generating the security policy association data is part of a policy authority unit operatively coupled to a plurality of subscriber units and wherein the digital signature is that of the policy authority unit.

20. The apparatus of claim 18 including a policy association data signature verifier including a digital signature verification algorithm to determine whether the digital signature originated from a trusted source.

21. The apparatus of claim 13 wherein means for comparing includes a hash value generator that computes a hash value of executable file data associated with a calling application as the second policy user identification data; and wherein the means for comparing compares the computed hash value with the first policy user identification data in the policy association data.

22. The apparatus of claim 13 wherein the security policy association data is a list containing object identifier data as the policy identification data.

23. The apparatus of claim 13 wherein the means for generating the security policy association data is part of a subscriber unit in a public key infrastructure system.

24. The apparatus of claim 13 including means for generating selected policy rule data through an interface that receives selectable policy rules and associated allowable values for the policy rules.

25. The apparatus of claim 13 wherein the security engine provides information security operations for a plurality of software applications and wherein the security engine enforces all security policy rules indicated in the security policy association data for a calling application identified by the policy user identification data.

26. A storage medium comprising:

memory containing executable program data that when read by one or more processing units, causes the one or more processing units to:

generate security policy association data on a per security engine user basis wherein the security policy association data includes data representing at least first policy user identification data and corresponding policy identification data wherein the first policy user identification data is based on executable file data of a software program and wherein the first policy user identification data is derived at least in part by applying a hash function to at least a portion of the executable file data;

store the security policy association data;

obtain second policy user identification data after the security policy association data has been generated; and compare at least the first stored policy user identification data with the second policy user identification data on a per security engine use user basis and using the stored policy identification to control security policy requirements when the first and second policy user identification data matches.

27. The storage medium of claim 26 wherein the first policy user identification data is an internet protocol address.

28. The storage medium of claim 26 wherein the security policy association data includes policy user type data that includes data representing whether a user is a software application or other security engine user type.

29. The storage medium of claim 26 wherein the security policy association data includes policy rule data.

30. The storage medium of claim 26 wherein the security policy association data further includes location data allowing determination of where the executable file data is located in memory.

31. The storage medium of claim 26 including the step of applying digital signature data of a trusted authority to the policy association data.

32. The storage medium of claim 31 wherein the step of generating the security policy association data is performed by a policy authority unit operatively coupled to a plurality of subscriber units and wherein the digital signature is that of the policy authority unit.

33. The storage medium of claim 31 including the step of using a digital signature verification algorithm to determine whether the digital signature originated from a trusted source.

34. The storage medium of claim 26 wherein the step of comparing includes: computing a hash value of executable file data associated with a calling application as the second policy user identification data; and comparing the computed hash value with the first policy user identification data in the policy association data.

35. The storage medium of claim 26 wherein the security policy association data is a list containing object identifier data as the policy identification data.

36. The storage medium of claim 26 wherein the step of generating the security policy association data is performed by a subscriber unit in a public key infrastructure system.

37. The storage medium of claim 26 including generating selected policy rule data through an interface that receives selectable policy rules and associated allowable values for the policy rules.

38. The storage medium of claim 26 wherein the security engine provides information security operations for a plurality of software applications and wherein the security engine enforces all security policy rules indicated in the security policy association data for a calling application identified by the policy user identification data.

39. A method for facilitating information security policy control for at least one information security engine comprising the steps of:

generating security policy association data on a per security engine user basis wherein the security policy association data includes data representing at least first policy user identification data and corresponding policy identification data wherein the first policy user identification data is an internet protocol address;

storing the security policy association data;

obtaining second policy user identification data after the security policy association data has been generated; and comparing at least the first stored policy user identification data with the second policy user identification data on a per security engine user basis and using the stored policy identification to control security policy requirements when the first and second policy user identification data matches.

* * * * *